United States Patent [19]

Sumi et al.

[11] 4,356,695

[45] Nov. 2, 1982

[54] BY-PASS VALVE APPARATUS OF AN EXHAUST TURBOCHARGER FOR AN INTERNAL COMBUSTION ENGINE

[75] Inventors: Yasuo Sumi; Tsuguo Watanabe; Ken Yamane, all of Yokohama, Japan

[73] Assignee: Nissan Motor Co., Ltd., Yokohama, Japan

[21] Appl. No.: 104,662

[22] Filed: Dec. 17, 1979

[30] Foreign Application Priority Data

Dec. 18, 1978 [JP] Japan ................................ 53-155012

[51] Int. Cl.³ .............................................. F02B 37/12
[52] U.S. Cl. ........................................ 60/602; 417/47
[58] Field of Search ................ 60/600, 601, 602, 603; 417/20, 43, 46, 47

[56] References Cited

U.S. PATENT DOCUMENTS

| 1,419,316 | 6/1922 | Sherbondy | 417/43 |
| 2,558,968 | 7/1951 | Lee | 60/600 |
| 2,559,623 | 7/1951 | Holmes | 60/600 X |
| 4,075,849 | 2/1978 | Richardson | 60/602 |

Primary Examiner—Michael Koczo
Attorney, Agent, or Firm—Schwartz, Jeffery, Schwaab, Mack, Blumenthal & Koch

[57] ABSTRACT

A by-pass valve apparatus for an exhaust turbocharger for an internal combustion engine is disclosed; the by-pass valve opening is controlled by the total pressure of air flow at the impeller outlet of a compressor of the turbocharger, in place of using the suction conduit static pressure of conventional apparatus.

3 Claims, 7 Drawing Figures

BY-PASS VALVE APPARATUS OF AN EXHAUST TURBOCHARGER FOR AN INTERNAL COMBUSTION ENGINE

BACKGROUND OF THE INVENTION

The present invention relates to a by-pass valve apparatus of an exhaust turbocharger for an internal combustion engine.

One of the known by-pass valve apparatus of a turbocharger for an internal combustion engines is shown in FIG. 1. An exhaust conduit 2 of an internal combustion engine 1 includes a turbine 3a of a turbocharger 3. The turbine 3a is driven by the exhaust gas flow in the exhaust conduit 2 and drives a compressor 3b which is connected with the turbine 3a. The compressor 3b is inserted in a suction conduit 5 and accelerates the suction air flow in the suction conduit 5 which supplies the suction air to the engine 1 through a throttle valve 5a which regulates the suction flow. Fuel injection valves 1' supply fuel to the suction side of the engine. The exhaust conduit 2 has a by-pass passage 6 which by-passes the turbine 3a. A by-pass valve apparatus 7 includes a valve stem 7a carrying on its one end a valve element 7b which regulates the gas flow in the by-pass passage 6, and a diaphragm device 8 having a diaphragm 9 which, in turn, is connected with the valve stem 7a. The diaphragm device 8 has a pressure receiving chamber 8a which is connected through a pressure conduit 10 with the suction conduit 5 at the outlet of the impeller of the compressor 3b, an air chamber 8c which is separated from the pressure receiving chamber 8a by the diaphragm 9 and is connected with atmosphere through an orifice 8b, and a spring 11 which is mounted in the air chamber 8c and urges the diaphragm 9.

Static pressure $P_2$ at the outlet of the compressor 3b is transmitted through the conduit 10 into the pressure receiving chamber 8a and urges the diaphragm 9 against the spring 11 to control the opening of the by-pass valve element 7b through the valve stem 7a. Thus, the exhaust flow which drives the turbine 3a is regulated so as to control the driving force of the compressor 3b. FIG. 2 shows detail of conventional construction of the pressure conduit 10 which is connected with the suction conduit 5 downstream of the outlet of the impeller of the compressor 3b to receive the static pressure $P_2$.

In the construction of the known by-pass valve apparatus referred to above, the set value of the static pressure $P_2$ at which the by-pass valve element 7b opens is determined with regard to knocking and damage of the engine 1. More specifically, when the by-pass valve element 7b is opened at the full open condition of the throttle valve 5b, the static pressure $P_2$ is maintained at the set value even when the rotational speed of the engine 1 is increased, to prevent damage to the engine at the maximum rotational range during which the engine is subjected to the severest mechanical stress. Since the torque of the internal combustion engine is proportional to the boosted pressure, and since the boosted pressure is proportional to the compressor pressure and to the static pressure $P_2$, maintenance of the static pressure $P_2$ at the set value will result in maintaining the engine torque at a constant value as shown by the dash-dot line in FIG. 5.

As described, the known by-pass valve performs a suitable control at the maximum rotational range of the engine. However, at the intermediate and low speed ranges of the engine also, the by-pass valve is opened to maintain the engine torque constant, regardless of margins for the engine rotation and the by-pass valve opening, so that torque properties at the intermediate and low speed ranges of the engine cannot be fully utilized.

In Diesel engines and petroleum engines for automobiles, it is desirable to improve not only the maximum output but also the torque properties at the intermediate and low speed ranges.

To improve the torque properties at the intermediate and low speed ranges, it is necessary to increase the rotational speed of the turbocharger as high as possible. Although the by-pass valve may be controlled by detecting rotational speed of the turbocharger, the construction will be complicated. The static pressure $P_2$ changes by suction air flow rate, even though the rotation of the turbocharger is kept constant. Thus, conventional turbocharger control on the basis of static pressure $P_2$ is not sufficient to cover the whole speed range of the engine.

SUMMARY OF THE INVENTION

Accordingly, an object of the present invention is to provide an improved by-pass valve apparatus of an exhaust turbocharger for an internal combustion engine controlled by a parameter which is generally proportional to the turbocharger rotation but is not influenced by variations in the engine air flow rate or the engine rotation.

The present invention is based on the recognition that an advantageous control can be effected by making use, as a parameter, of the total pressure, namely the sum of the static pressure and the dynamic pressure, at the impeller outlet of the compressor of the exhaust turbocharger.

According to the present invention, in order to attain the above-mentioned object, there is provided a by-pass valve apparatus of an exhaust turbocharger for an internal combustion engine comprising a by-pass conduit which passes exhaust gas by-passing a turbine of the exhaust turbocharger, the by-pass valve apparatus being provided to open and close the by-pass conduit, wherein said by-pass valve apparatus includes a valve element and a diaphragm device connected with the valve element and actuated by total pressure of air flow at impeller outlet of a compressor which is driven by the turbine.

By utilizing the total pressure, the by-pass valve is opened later than in the conventional apparatus at the intermediate and low speed ranges of the engine so that compressor rotation becomes higher to provide a higher torque. Further, the by-pass valve is more opened by detecting dynamic pressure of the compressor at the high speed range of the engine to ensure the safety of the engine. FIG. 5 shows relation between torque and engine rotational speed (RPM). In FIG. 5, the solid line shows torque characteristics of the engine according to the present invention and the dash-dot line shows that of the conventional engine. It is clear that both are similar at the high speed range, but the engine according to the present invention, utilizes high torque range at the intermediate and low speed ranges.

Preferably, said total pressure of air flow is detected by a total pressure probe which is mounted through a compressor housing and opens opposed to the impeller outlet.

One embodiment of the by-pass valve apparatus, according to the present invention, by way of example, will now be described with reference to the accompanying drawings.

DETAILED DESCRIPTION OF AN EMBODIMENT

Figure 1:
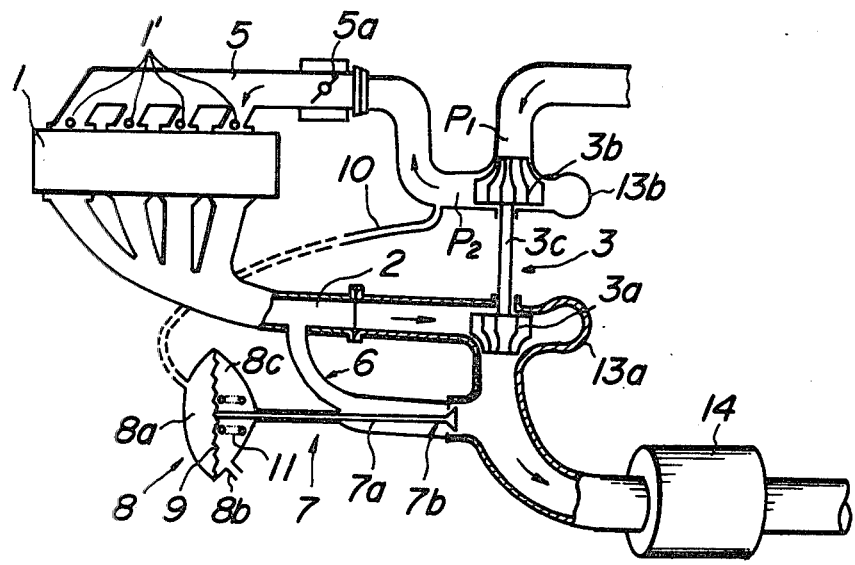
FIG. 1 is an illustration of a conventional by-pass valve apparatus of an exhaust turbocharger for an internal combustion engine.
Figure 2:
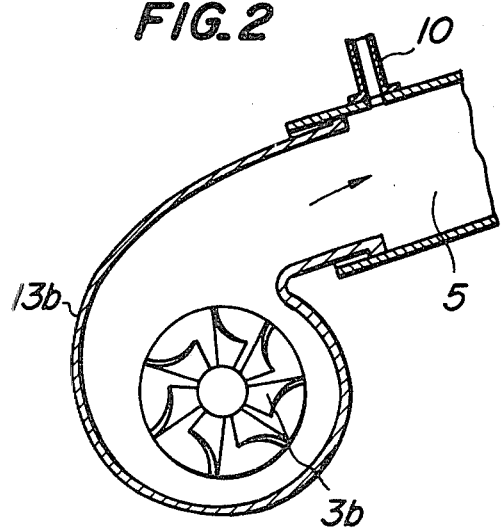
FIG. 2 is an illustration showing connection between the pressure conduit and a suction conduit shown in FIG. 1.

An internal combustion engine with a turbocharger to which the present invention can be suitably applied may be basically similar with that shown in FIG. 1.

Referring to FIG. 1, an exhaust conduit 2 of an internal combustion engine 1 is connected to a turbine housing 13a which encloses a turbine 3a of a turbocharger 3, so as to drive the turbine 3a by the exhaust gas flow in the exhaust conduit 2. The turbine 3a is connected through a shaft 3c with a compressor 3b of the turbocharger 3. The compressor 3b is enclosed by a compressor housing 13b which is connected with a suction conduit 5 located upstream of a throttle valve 5a. The compressor 3b is driven by the turbine 3a to supply compressed suction air through the throttle valve 5a and the suction conduit 5 into the engine 1.

Outlet of the turbine housing 13a is connected with an exhaust muffler 14. An exhaust by-pass conduit 6 is branched from the exhaust conduit 2, and connected with the outlet side of the turbine housing 13a, by-passing the turbine 3a. Thus, a portion of the exhaust gas is passed to the exhaust muffler 14 without passing through the turbine 3a, and the amount of the gas flow through the by-pass conduit 6 is controlled by an exhaust by-pass valve 7b of an exhaust by-pass valve apparatus 7. A valve stem 7a connected with the exhaust by-pass valve element 7b is secured to a diaphragm 9 of a diaphragm device 8. The diaphragm device 8 has a pressure receiving chamber 8a and an air chamber 8c which is separated from the chamber 8a by the diaphragm 9 and is connected to the atmosphere by an orifice 8b. A spring 11 in the air chamber 8c urges the diaphragm 9 to the left as seen in FIG. 1 and acts to close the exhaust by-pass valve element 7b.

Figure 3:
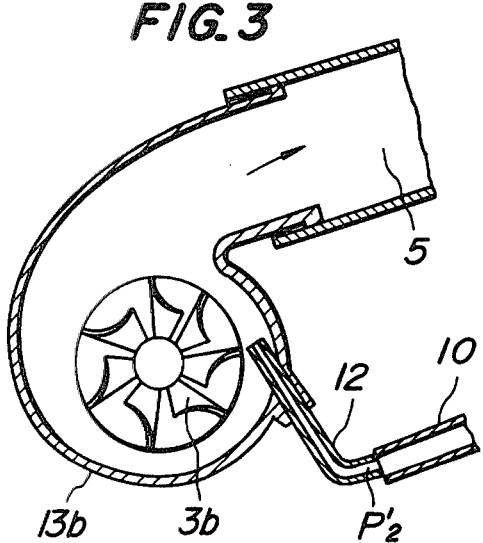
FIG. 3 is a sectional view showing connection between a total pressure probe, according to the present invention, and a compressor housing.
Figure 4:
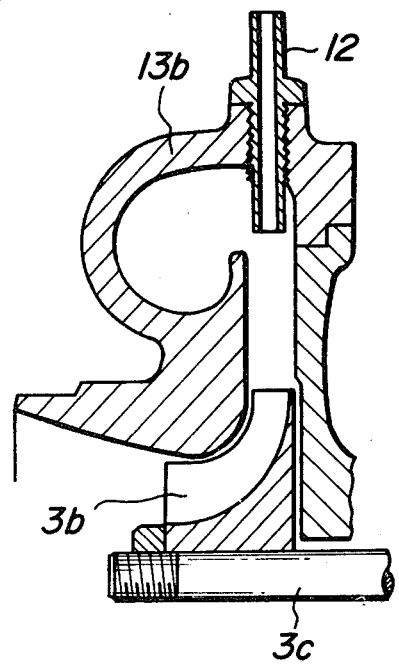
FIG. 4 is a sectional view taken along the compressor axis of FIG. 3.
Figure 5:
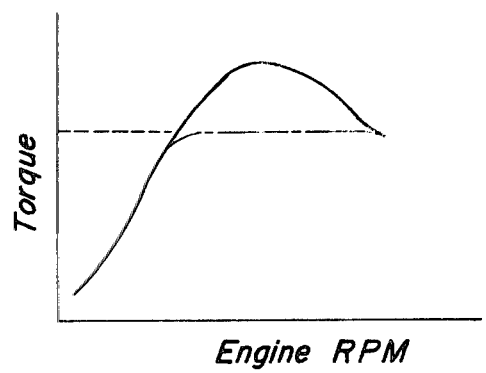
FIG. 5 is a diagram showing the torque property curve according to the present invention.

According to the present invention, a pressure conduit 10 is connected at one end with the pressure receiving chamber 8a and, at the other end, with a total pressure probe 12 shown in FIGS. 3 and 4. The probe 12 is connected with, and extends through the impeller housing 3b in tangential direction to be opened in opposition to the impeller outlet air of the compressor 3b to receive the dynamic pressure of the compressed air. Thus, the pressure conduit 10 transmits the total pressure $P'_2$ of the impeller outlet of the compressor 3b to the pressure receiving chamber 8a of the diaphragm device 8.

The effect of the present invention as compared with the conventional exhaust by-pass valve apparatus shown in FIG. 1, will be explained hereinafter with reference to FIGS. 6 and 7.

The compressor inlet pressure is represented by $P_1$, the static pressure at the compressor outlet by $P_2$, and the total pressure, i.e. sum of the static pressure and the dynamic pressure at the impeller outlet of the compressor by $P'_2$. FIG. 6 shows a diagram of the ratio $P_2/P_1$ to the engine air flow rate at a constant throttle opening, and FIG. 7 shows a diagram of the ratio $P'_2/P_1$ to the engine air flow rate at a constant throttle opening. The engine air flow rate is approximately proportional to the engine revolutional speed (RPM). In FIGS. 6 and 7, dash-dot line represents the surge line, and dash-two dots lines represent the compressor revolutional speed. Comparing FIGS. 6 and 7, the pressure ratio $P'_2/P_1$ represents the compressor revolutional speed more precisely than the pressure ratio $P_2/P_1$, as to the engine air flow rate. Thus, by utilizing the total pressure $P'_2$ at the impeller outlet of the compressor, a control value can be obtained which changes approximately proportional to the compressor revolutional speed. This means that by maintaining the pressure ratio $P'_2/P_1$ constant, the compressor revolutional speed does not substantially change and hence, the output torque can be maintained substantially constant, compared with the conventional control which maintains the pressure ratio $P_2/P_1$ constant.

Figure 6:
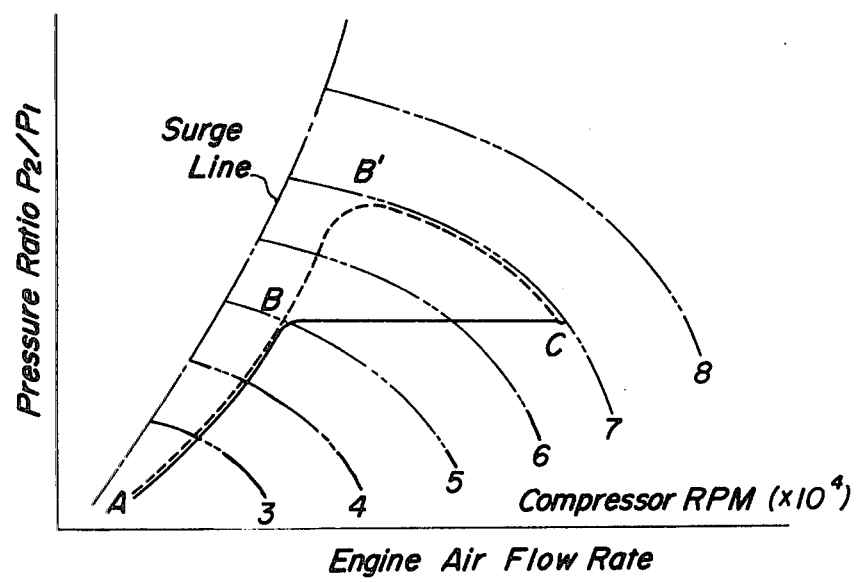
FIG. 6 is a diagram showing the relation between the pressure ratio $P_2/P_1$ and the engine air flow rate at a constant throttle opening.
Figure 7:
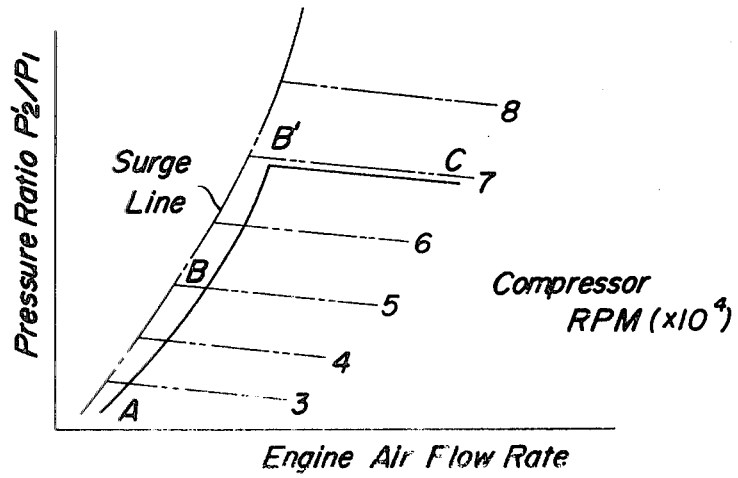
FIG. 7 is a diagram showing the relation between the pressure ratio $P'_2/P_1$ and the engine air flow rate at a constant throttle opening.

Operation of the conventional by-pass valve is shown in FIG. 6 by the solid line ABC. At the point B, the by-pass valve begins to open, and the control line is represented as the straight line BC until the full open position C to obtain a constant torque. The by-pass valve, according to the present invention, is shown in FIG. 7 by the solid line ABB'C. The by-pass valve is closed along the line ABB' and begins to open at the point B'. The by-pass valve is controlled by the total pressure $P'_2$ until the full open position C is reached to obtain a constant compressor revolutional speed. Thus, the maximum torque can be utilized efficiently. The broken line ABB'C shown in FIG. 6 is a calculated line of the line ABB'C of FIG. 7 into the pressure ratio $P_2/P_1$. As shown in FIG. 6, the line ABB'C increases until the desired maximum revolutional speed of the compressor is reached, so that the maximum torque at the intermediate revolutional speed range of the engine can be efficiently utilized. To obtain the maximum revolution point B' of the compressor shown in FIGS. 6 and 7, biasing force of the spring 11 is suitably regulated.

It will be appreciated that, by utilizing the total pressure of the compressor as the control pressure of the by-pass valve apparatus, according to the invention, torque properties at the intermediate and low speed range of the engine are substantially improved, compared with conventional engine with a turbocharger.

What is claimed is:

1. A by-pass valve apparatus of an exhaust turbocharger for an internal combustion engine including a compressor having a housing with a through passage and an inlet and an outlet, the compressor being inserted into an intake air conduit of the engine, a turbine inserted into an exhaust conduit of the engine, means for connecting the turbine to the compressor whereby the turbine is driven by exhaust gas from the engine and drives the compressor, and a by-pass conduit selectively connected to the exhaust conduit upstream of the turbine, the by-pass conduit by-passing the turbine to waste the exhaust gas therethrough, the by-pass valve apparatus being provided to selectively open and close the by-pass conduit and comprising in combination:
- a pressure probe for detecting the total pressure of the intake air flow downstream of the compressor;
- a diaphragm device having a diaphragm which defines first and second chambers, the first chamber being in communication with the pressure probe and supplied with the total pressure detected by the pressure probe, the second chamber being in communication with atmospheric pressure; and
- a by-pass valve having a valve element inserted into the by-pass conduit, and a valve stem, one end of which is connected to the valve element and another end with the diaphragm.

2. An apparatus as claimed in claim 1, wherein the pressure probe is mounted through the housing of the compressor and opened to an impeller outlet.

3. An apparatus as claimed in claim 1, wherein the pressure probe is mounted through the housing of the compressor in a direction tangential to the flow of air through the compressor, the probe opened in opposition to the outlet air of the compressor.

* * * * *